(12) United States Patent
    Bear

(10) Patent No.: US 10,272,311 B2
(45) Date of Patent: Apr. 30, 2019

(54) HOCKEY FACE OFF TRAINING DEVICE

(71) Applicant: Conrad Bear, Winnipeg (CA)

(72) Inventor: Conrad Bear, Winnipeg (CA)

(73) Assignee: Conrad Bear, Winnipeg (CA)

( * ) Notice: Subject to any disclaimer, the term of this patent is extended or adjusted under 35 U.S.C. 154(b) by 0 days.

(21) Appl. No.: 15/689,197

(22) Filed: Aug. 29, 2017

(65) Prior Publication Data

US 2018/0185728 A1    Jul. 5, 2018

(51) Int. Cl.
    *A63B 69/00*   (2006.01)
    *A63B 67/00*   (2006.01)
    *A63B 71/02*   (2006.01)
    *G09B 19/00*   (2006.01)

(52) U.S. Cl.
    CPC .......... *A63B 69/0026* (2013.01); *A63B 67/00* (2013.01); *A63B 71/023* (2013.01); *G09B 19/0038* (2013.01); *A63B 2071/026* (2013.01); *A63B 2208/00* (2013.01)

(58) Field of Classification Search
    CPC ............ A63B 69/0026; A63B 69/0024; A63B 69/0091; A63B 63/06; A63B 69/002; A63B 69/0053; A63B 67/00; A63B 71/023; A63B 2071/026; G09B 19/0038
    USPC ............... 473/446, 438, 422, 423, 435, 451; 482/83
    See application file for complete search history.

(56) References Cited

U.S. PATENT DOCUMENTS

| | | | | | |
|---|---|---|---|---|---|
| 1,436,962 | A | * | 11/1922 | Kaiser ...................... | A63F 7/00 273/123 R |
| 2,427,434 | A | * | 9/1947 | Whitehouse ............ | A63F 7/305 273/127 D |
| 3,635,476 | A | * | 1/1972 | Breslow ................ | A63F 9/0204 473/576 |
| 3,690,664 | A | * | 9/1972 | Hauke ................... | A63F 9/0204 273/118 R |
| 3,854,728 | A | * | 12/1974 | Brandell ............... | A63F 7/3065 473/183 |
| 4,249,743 | A | * | 2/1981 | Lee ............................ | F41J 7/04 273/391 |
| 4,516,769 | A | * | 5/1985 | Kopp ................. | A63B 69/0024 473/423 |
| 4,641,834 | A | * | 2/1987 | Hegedus ............ | A63B 69/0091 473/446 |
| 4,645,210 | A | * | 2/1987 | Patsy ..................... | A63B 63/06 473/446 |

(Continued)

*Primary Examiner* — Mitra Aryanpour
(74) *Attorney, Agent, or Firm* — Kyle R Satterthwaite; Ryan W Dupuis; Ade & Company Inc.

(57) ABSTRACT

A hockey faceoff training device features an impact member with a lower end normally residing at ground level. A movable joint connecting the impact member to a stationary frame at an elevated distance above said lower end. The impact member is movable about the movable joint in one or more directions lifting said lower end of the impact member from ground level. Use of the device involves impact of the impact member by a hockey stick of a practicing athlete to lift said lower end of the impact member from ground level, thereby simulating an act of sweeping or batting out an opponent's hockey stick during a face-off. One or more springs bias the impact member into the normal position to provide improved resistance, and weights are used to temporarily securer same in a stationary, stable position at any practice site, while a carry handle enables easy transport.

17 Claims, 2 Drawing Sheets

(56) References Cited

U.S. PATENT DOCUMENTS

| | | | | |
|---|---|---|---|---|
| 5,362,045 A | * | 11/1994 | Hammett | A63B 69/0026 473/435 |
| 5,660,550 A | * | 8/1997 | Roche | A63B 22/02 473/427 |
| 6,093,119 A | * | 7/2000 | Tipton | A63B 69/0053 473/438 |
| 7,527,567 B2 | * | 5/2009 | Ohle | A63B 69/002 473/446 |
| 7,534,176 B1 | * | 5/2009 | McNary | A63B 69/0026 473/446 |
| 8,157,676 B2 | * | 4/2012 | Cobham | A63B 69/0026 473/422 |
| 8,480,517 B2 | * | 7/2013 | Guttler | A63B 47/002 473/422 |
| 8,777,781 B2 | * | 7/2014 | Marks | A63B 69/002 473/446 |
| 8,894,512 B2 | * | 11/2014 | Gilman | A63B 69/0091 473/438 |
| 2004/0266563 A1 | * | 12/2004 | Young | A63B 69/002 473/446 |
| 2008/0300072 A1 | * | 12/2008 | Harpell | A63B 67/14 473/446 |
| 2016/0250538 A1 | * | 9/2016 | Bulloch | A63B 69/0026 473/446 |
| 2016/0375334 A1 | * | 12/2016 | Ragen | A63B 69/002 473/429 |

* cited by examiner

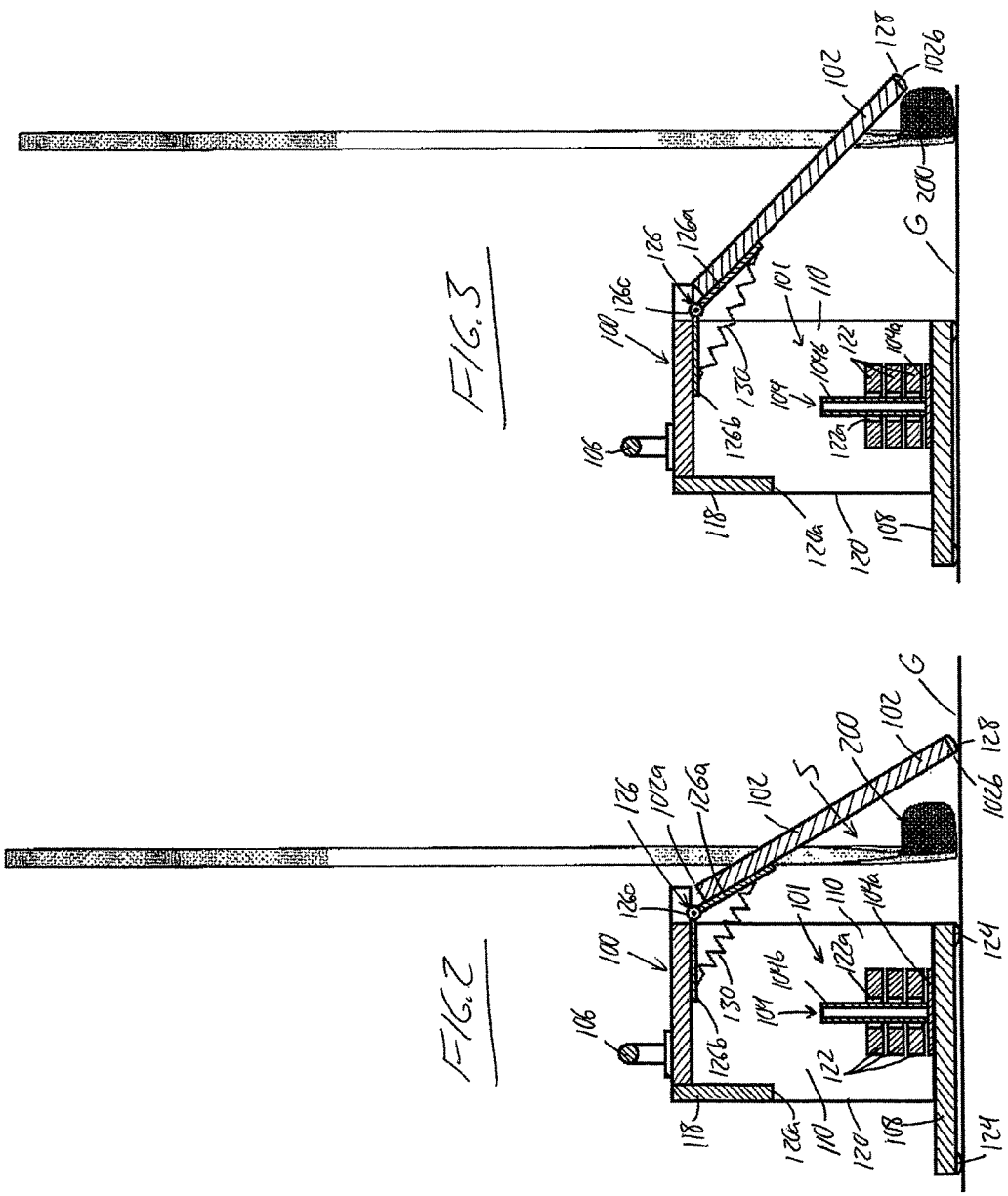

HOCKEY FACE OFF TRAINING DEVICE

CROSS REFERENCE TO RELATED APPLICATIONS

This application claims benefit under 35 U.S.C. 119(a) of Canadian Patent Application No. 2,953,597, filed Jan. 4, 2017.

FIELD OF THE INVENTION

The present invention relates generally to training devices for athletes, and more particularly to a face-off training device for hockey players.

BACKGROUND

The present invention provides assistance in the technique (stance, leverage, position, strength) needed to be successful in winning face-offs in hockey.

In an average NHL (National Hockey League) game there are 60 face-offs. This averages to one face off per minute. Puck possession is the key factor in winning hockey games. To increase success rates in the face-off circle will increase the success of the hockey team in the categories of wins and puck possession.

Accordingly, there is a need for training equipment and techniques for improving athlete performance in the context of a hockey face-off.

SUMMARY OF THE INVENTION

According to one aspect of the invention there is provided a hockey faceoff training device comprising:

an impact member having a lower end normally residing at ground level, with a remainder of the impact member reaching upwardly away from said lower end;

a movable joint by which the impact member is connected or connectable to a stationary frame at an elevated distance above said lower end;

the impact member being movable about the movable joint in one or more directions lifting said lower end of the impact member from ground level;

whereby faceoff training by a practicing athlete is enabled by impact of the impact member by a hockey stick of said practicing athlete to lift said lower end of the impact member from ground level, thereby simulating an act of sweeping or batting out an opponent's hockey stick during a hockey face-off.

Preferably the movable joint comprises a pivotal joint by which the impact member is pivotal in said one or more directions.

In one embodiment, said movable joint comprises a unidirectional pivot joint by which the impact member is pivotal about a singular axis.

Preferably said impact member is biased into a default position placing the lower end of the impact member at ground level.

Preferably the impact member is spring biased into said default position.

In one embodiment, one or more coiled tension springs are coupled to the impact member to spring bias same into said default position.

Preferably said stationary frame is a portable frame for seated placement in a stationary position atop a ground surface against which the lower end of the impact member normally resides.

There may be included one or more weights positioned or positionable on the portable frame to better maintain the stationary position thereof during use of the training device.

Preferably a weight holder is provided on the portable frame for receipt of said one more weights.

Preferably said weight holder comprises a shaft over which one or more disc weights are slidable onto and off of said weight holder, said disc weights each having a respective opening passing axially therethrough for receipt of said shaft through said opening.

Preferably said shaft of the weight holder is oriented to stand perpendicularly upright relative to the ground surface when the portable frame is seated on said ground surface in a working position with the impact member reaching downwardly to the ground surface from the movable joint.

In one embodiment, the stationary frame comprises a base for placement atop the ground surface, a pair of uprights standing upward from the base, a bridge spanning across said uprights at an elevation above the base, and a weight-accommodating space delimited between the uprights above the base and below the bridge for receipt of the one or more weights atop the base within said weight-accommodating space.

Preferably said portable frame comprises a carry handle.

On one embodiment, the carry handle is mounted atop said bridge.

Preferably there are one or more frictional feet on a bottom surface of the portable frame to better maintain the stationary position thereof during use of the training device.

Preferably there are one or more grips at the bottom end of the impact member for frictional ground contact to resist movement of the impact member.

BRIEF DESCRIPTION OF THE DRAWINGS

One embodiment of the invention will now be described in conjunction with the accompanying drawings in which:

FIG. 2 is a cross-sectional view of the face off training device of FIG. 1 in a fully assembled state, with an impact member thereof spring-biased into a default position contacting the ground and ready for impact by a practicing athlete's hockey stick.

FIG. 3 is another cross-sectional view of the face off training device of FIG. 2, but showing the impact member pivoting upwardly out of the contact with the ground under impact by the hockey stick.

In the drawings like characters of reference indicate corresponding parts in the different figures.

DETAILED DESCRIPTION

Figure 1:
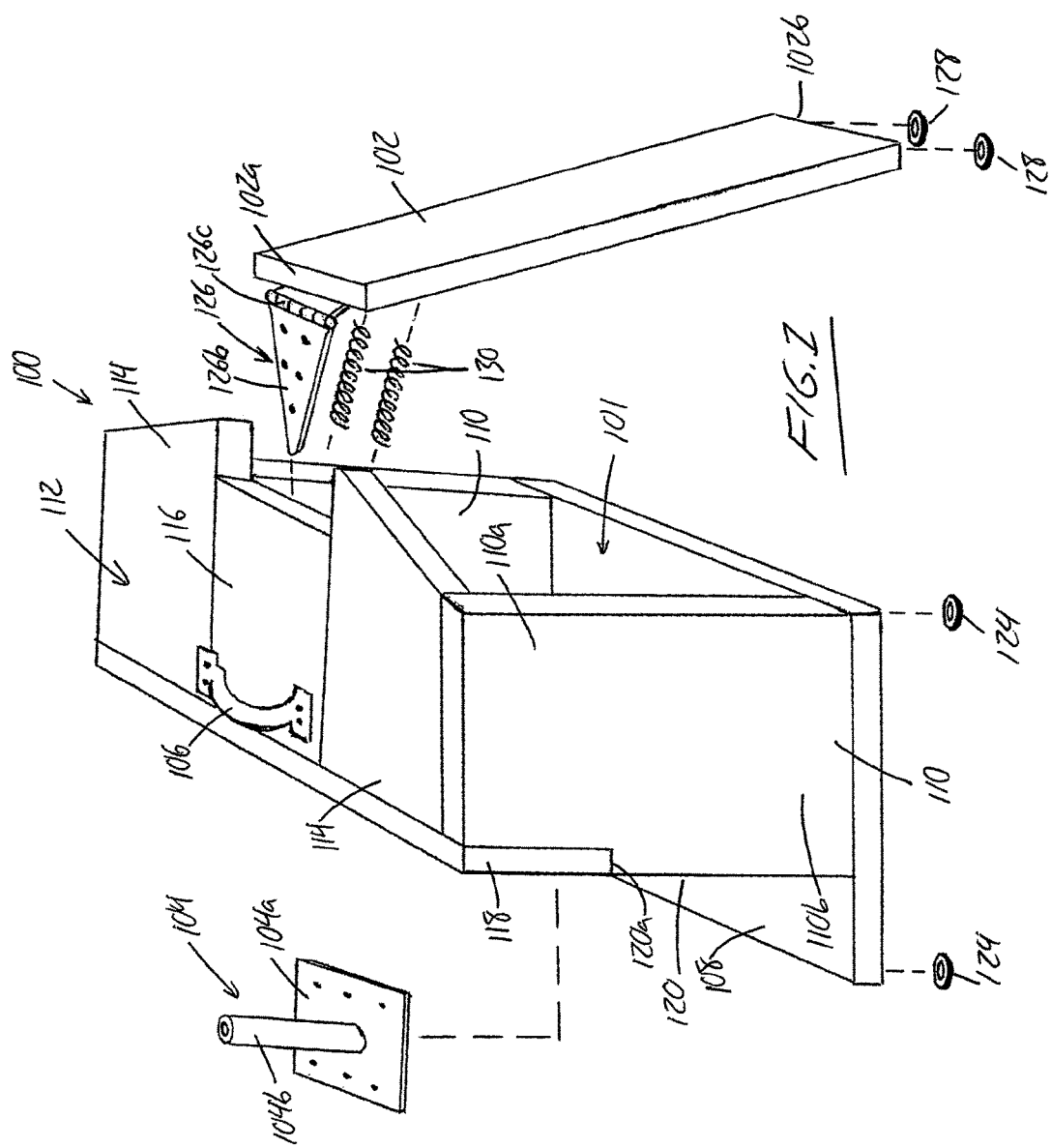
FIG. 1 is a partially exploded side perspective view of a face off training device of the present invention.

FIG. 1 provides a partially exploded view of a face off training device of the present invention, which features a frame 100, an impact member 102 for pivotal coupling to the frame, a weight holder 104 for attachment to the frame to accept one or more weights that contribute to a stationary working position during use, and a carry handle 106 attached to the frame for portable hand-carried transport thereof.

The frame 100 features a rectangular base panel 108 for seated placement atop a ground surface G in an orientation lying parallel thereto. At opposing ends of the base panel 108, a pair of rectangular upright panels 110 stand perpendicularly upward from the plane of the base panel. The upright panels 110 lie parallel to the respective ends of the base panel 108 so that the broad faces of the two upright panels 110 face toward one another across the base panel 108. At top ends of the upright panels 110, an upper bridge 112 spans between the upright panels 110 in parallel relation to the base panel 108 at a spaced elevation thereabove. In the illustrated embodiment, the bridge has three distinct sections, namely two shoulder areas 114 respectively attached to the two upright panels, and a central neck area 116 disposed between the two shoulder areas. With the frame seated atop a horizontal ground surface G in the illustrated working position of FIGS. 2 and 3, the base 108 and the bridge 112 lie horizontally parallel to the ground, with the two uprights 110 standing vertically upright between the base and the bridge.

A rectangular reinforcement panel 118 lies in a vertical plane that spans horizontally between the two uprights 110 at rear edges 120 thereof. The rear edge of each upright has a stepped profile corresponding to a non-uniform width profile of the upright 110. An upper portion 110a of the upright 110 that carries the bridge 112 has a lesser width measured between the front and rear edges of the upright 110 than a lower portion 110b that attaches to the base 108. The stepped transition at the rear edge of the upright creates a ledge 120a atop which the reinforcement panel 118 is seated and fastened to the narrower upper portion 110a of the upright 110. The front face of the reinforcement panel 118 abuts against the rear edge of the upper bridge 112, where the upper bridge and reinforcement panel are fastened together.

The carry handle 106 is mounted atop the bridge 112, specifically at the central neck area 116 thereof in the case of the illustrated embodiment, for convenient and balanced lifting of the frame 100 out of the working position seated atop the ground surface G.

A hollow interior space 101 of the frame 100 is delimited between the opposing upright panels 110 and between the upper bridge 112 and the lower base 108. As shown in FIGS. 2 and 3, the weight holder 104 is mounted to the base 108 within this hollow interior space 101 of the frame 100, with a bottom plate 104a of the weight holder 104 mounted flush atop the base panel 108 and a support shaft 104b of the weight holder standing upright from the bottom plate 104a in perpendicular relation to the topside of the base 108. One or more disc weights 122 are stackable on the weight holder 104 atop the bottom plate thereof 104a by sliding a central axial opening 122a of each disc weight over the support shaft 104b, which is of slightly lesser diameter than the axial opening 122a in the disc weight 122. The stacked weights 122 increase the overall effective weight of the frame 100 to help retain a stationary state thereof on the ground surface G during use of the device.

The stationary state of the frame 100 is further maintained during use by the use of frictional feet 124 affixed to the underside of the base 108, for example at least at the four corners thereof, to improve the frictional interface of the frame 100 with the underlying ground surface G, thereby resisting sliding of the frame therealong.

The weighted frame forms a stationary support for the impact member 102, which is pivotally coupled to the central neck area 116 of the bridge 112 by a hinge 126. One leaf 126a of the hinge is attached to the rear face of the impact member 102 at an upper end 102a thereof, and the other leaf 126b is attached to the underside of the bridge 112 at the neck area 116 thereof, so that the knuckle 126c of the hinge lies parallel to the bridge 112 at the front edge thereof to define a horizontal pivot axis about which the impact member 102 can pivot swing.

A length of the impact member 102 measured between its upper and lower ends 102a, 102b exceeds a height of the frame 100 measured from the ground contacting plane of the frictional feet 124 (i.e. the frame's plane of contact with ground surface G) to the top of the bridge 112, whereby the length of the impact member 102 thus also exceeds an elevation measurement of the hinge's pivot axis above the ground surface G. As a result, with the hinge leaf 126a reaching forwardly from the pivot axis, the weight of the impact member 102 carried by this hinge leaf 126a will encourage the lower end 102b of the impact member 102 into contact with the ground surface G, whereby the default position of the impact member 102 reaches downwardly and forwardly to the ground surface G from near the top of the frame 100 at the front end thereof. The lower end of the contact member 102b may feature one or more frictional grips 128, for example in the form of the same frictional feet 124 applied to the underside of the frame's base 108. The frictional and feet and grips 124, 128 may for example be a resilient rubber material. In the illustrated example, the impact member 102 is a rectangular board having front and rear faces of broader extent than its four perimeter edges, whereby the broad rear face of the board provides a suitable mounting surface for the hinge leaf 126a, while the frictional grips 128 are mounted to a lower perimeter edge of the board.

In addition to gravitational bias of the impact member into a default position placing its lower end at ground level due to the action of the impact member's weight around the pivot axis of the hinge 126, one or more springs 130 are also connected between the impact member 102 and the frame 100 to likewise urge the impact member 102 into the default ground-contacting position around the hinge's pivot axis. In the illustrated embodiment, two coiled tension springs 130 on opposite sides of the hinge 126 each have one end connected to the rear face of the impact member 102 and the other end connected to the frame at the underside of the upper bridge 112. Alternatively, the second end of each spring 130 may be connected to the frame at an another location, for example to the reinforcement member 118 at the rear of the frame. In either case, the self-collapsing action of the tension spring 130 pulls the impact member 102 rearwardly about the pivot axis of the hinge 126 to urge the lower end 102b of the impact member downwardly into contact with the ground surface G. It will be appreciated that other means of spring loading the impact member to bias same into the default ground-contacting position may be employed, for example including the use of one or more torsion springs acting about the impact member's pivot axis.

As shown in FIG. 2, a generally triangular space S normally exists between the ground surface G and the impact member 102 in front of the frame 100, which accommodates insertion of a hockey stick's blade 200 into this space S beneath the impact member from either side thereof. In this scenario, the angled position of the impact member 102 sloping forwardly down to the ground surface G from the near the top of the frame 100 simulates an opponent's hockey stick at a face-off circle. The athlete practicing their face-off technique with the training device inserts their blade 200 into the open stick space S between the impact member 102 and the ground surface G at the front of the frame 100, and forces the blade 200 forwardly away from the frame 100 and/or upwardly away from the ground surface G against the backside of the sloped impact member 102, whereby the impact of the hockey stick blade 200 against the impact member 102 with enough force to overcome the resistance of the springs 130 forces the lower end 102b of the impact member 100 upwardly out of contact with the ground surface G. This action simulates a stick sweeping action by which the practicing player's stick "sweeps out" the simulated opponent stick (impact member 102) from beneath/behind. By sweeping or batting away the opponent stick, the player would gain access to the puck in a real face-off situation. The stick space S beneath the impact member 102 is accessible from either side thereof to accommodate both left and right handed players, and different face-off stances or techniques.

Prototypes constructed in accordance with the illustrated embodiment employ a wood construction with wooden frame members joined by screw fasteners and adhesive, and a wooden impact member with screw-fastened hinge attachment. However, other sufficiently strong materials (e.g. metals, relatively hard/rigid plastics) may alternatively be employed to provide a robust frame construction of suitable strength and stability capable of preventing movement and damage thereof by repeated hockey stick impact. The prototypes employed coiled tension springs with screw-fastened attachment to the frame and impact member, but other spring types (e.g. torsion spring) or attachment techniques may alternatively be employed.

While the illustrated embodiment uses a shaft-style weight holder for cooperation with commercially available disc weights, weights of any suitable size may alternatively be simply placed atop the base without a dedicated weight holder as such. In one example compatible with weights of various types or shapes, the base may feature upright perimeter walls closing around a confined weight space, whereby the walls prevent the loosely placed weights from sliding off the base. Other types of weight holders or weight retention means may alternatively be employed. While the illustrated embodiment employs a portable frame that is weighed down for steadfast retention of a stationary position during use, but that is not permanently anchored or fastened down and is easily hand carried to and from any practice location, other embodiments may use a permanently or movably anchored down frame to pivotally support the impact member. Likewise, the particular structure of the frame may vary from that described herein while still providing the equivalent function of a stationary support for the movable impact member.

The forgoing disclosure provides a piece of practice equipment with a frame made of strong material, and a movable impact member simulating a standard hockey faceoff for the purpose of developing, strength and technique needed to be successful on the hockey face-off. It is believed that use of the product will provide increased strength and enhanced technique for the successful winning hockey draws, thus being particularly useful to assist, player development of a team's center men to acquire and maintain techniques and strength associated with successful performance at their team position. With repetitive use of the product, the player may increase their percentage of face-off wins, providing tangible results, while also building confidence and strength within this important aspect of their team position.

In addition to the robust frame structure of the illustrated embodiment that handles the continuous impacts from the user's hockey stick, the width of the frame measured between the outer faces of the uprights may be selected to simulate the stance width of a face-off opponent, for example measuring between 18 to 30 inches, and approximately 24-inches in particular embodiments based on Applicant's prototypes. In the illustrated embodiment, the two shoulder areas of the upper bridge reach further forward than the central neck area between them, thus visually simulating the upper torso appearance of an opponent. In the illustrated embodiment, the base reaches further rearward than the uprights in order to provide additional stability against rearward tipping of the frame under strong impact by the user's stick.

While the illustrated embodiment features uncoated, uncovered, and unornamented frame and impact members, other embodiments may features ornamental or protective coatings or coverings, for example using puckboard sheeting (e.g. high density polyethylene—HDPE—sheet material) of the same type used for hockey rink dasher boards, and for example featuring similar ornamental aspects to such dasher boards, such as coloured lines, for example with a yellow coloured strip running horizontally of each upright piece of sheet material near the bottom of the frame and a red coloured strip running horizontally of each upright piece of sheet material near the bottom of the frame.

As another variation on the illustrated embodiment, instead of using a hinge to form a unidirectional joint with only a single pivot axis about which the impact member is movable, a multi-directional joint may alternatively be employed to allow deflection of the impact member in multiple directions. For example, a ball joint between the frame and the impact member may be used to define a multidirectional joint allowing pivot-like deflection of the impact member in multiple directions about multiple axes.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A hockey faceoff training device comprising:
a stationary frame having a base for placement in a seated position atop an underlying ground surface, said stationary frame having a contacting plane that resides at an underside of the base in contact with said ground surface in the seated position of the stationary frame:
an impact member having a default position in which a lower end of the impact member resides in said contacting plane for contact with said ground surface, with a remainder of the impact member reaching upwardly away from said lower end;
a movable joint by which the impact member is connected to the stationary frame at an elevated distance above said lower end of the impact member and above said contacting plane of the stationary frame;
the impact member being movable about the movable joint in one or more directions lifting said lower end of the impact member from said contacting plane;
whereby faceoff training by a practicing athlete is enabled by impact of the impact member by a hockey stick of said practicing athlete to lift said lower end of the impact member from the ground surface, thereby simulating an act of sweeping or batting out an opponent's hockey stick during a hockey face-off.

2. The training device of claim 1 wherein the movable joint comprises a pivotal joint by which the impact member is pivotal in said one or more directions.

3. The training device of claim 1 wherein said movable joint comprises a unidirectional pivot joint by which the impact member is pivotal about a singular axis.

4. The training device of claim 1 in combination with one or more weights positioned or positionable on the stationary frame to better maintain the seated position thereof during use of the training device.

5. The training device of claim 1 comprising a weight holder on the stationary frame for receipt of one more weights on said weight holder to better maintain the seated position of said stationary frame during use of the training device.

6. The training device of claim 5 wherein said weight holder comprises a shaft over which one or more disc weights are slidable onto and off of said weight holder.

7. The training device of claim 6 wherein said shaft of the weight holder is oriented to stand perpendicularly upright relative to the ground surface.

8. The training device of claim 6 in combination with said one or more disc weights, each of which comprises a respective opening passing axially therethrough for receipt of said shaft through said opening.

9. The training device of claim 4 wherein the stationary frame comprises a pair of uprights standing upward from the base, a bridge spanning across said uprights at an elevation above the base, and a weight-accommodating space delimited between the uprights above the base and below the bridge for receipt of the one or more weights atop the base within said weight-accommodating space.

10. The training device of claim 9 comprising a carry handle mounted atop said bridge.

11. The training device of claim 1 wherein the stationary frame comprises one or more frictional feet that are attached to the base at the underside thereof and occupy the contacting plane of the stationary frame to better maintain the seated position thereof during use of the training device.

12. The training device of claim 1 comprising one or more grips at the lower end of the impact member for frictional ground contact to resist movement of the impact member.

13. The training device of claim 1 wherein, in the default position of the impact member, an open space is delimited between the impact member and the contacting plane, and said open space is large enough to accommodate insertion of a blade of a hockey stick into said open space to impact the impact member from within said open space and thereby force the impact member out of the default position, thereby lifting the lower end of the impact member out of the contacting plane and out of contact with said ground surface.

14. A hockey faceoff training device comprising:
an impact member having a lower end normally residing at ground level,
with a remainder of the impact member reaching upwardly away from said lower end;
a movable joint by which the impact member is connected or connectable to a stationary frame at an elevated distance above said lower end;
wherein the impact member is movable about the movable joint in one or more directions lifting said lower end of the impact member from around level, and the impact member is spring biased into said a default position placing the lower end of the impact member at ground level;
whereby faceoff training by a practicing athlete is enabled by impact of the impact member by a hockey stick of said practicing athlete to lift said lower end of the impact member from ground level, thereby simulating an act of sweeping or batting out an opponent's hockey stick during a hockey face-off.

15. The training device of claim 14 comprising one or more coiled tension springs coupled to the impact member to spring bias same into said default position.

16. The training device of claim 14 wherein an open space is delimited between the default position of the impact member and an underlying ground surface touched by the lower end of said impact member in said default position, and said open space is large enough to accommodate insertion of a blade of a hockey stick into said open space to impact the impact member from within said open space and thereby force the impact member out of contact with said ground surface.

17. A hockey faceoff training device comprising:
an impact member having a default position in which a lower end of the impact member resides in contact with an underlying ground surface in a contacting plane, with a remainder of the impact member reaching upwardly away from said lower end and said contacting plane;
a movable joint by which the impact member is connected or connectable to a stationary frame at an elevated distance above said lower end and above said contacting plane;
the impact member being movable about the movable joint in one or more directions lifting said lower end of the impact member from said contacting plane;
wherein, in the default position of the impact member, an open space is delimited between the impact member and the contacting plane, and said open space is large enough to accommodate insertion of a blade of a hockey stick into said open space to impact the impact member from within said open space and thereby force the impact member out of the default position, thereby lifting the lower end of the impact member out of the contacting plane and out of contact with said ground surface;
whereby faceoff training by a practicing athlete is enabled by impact of the impact member by a hockey stick of said practicing athlete to lift said lower end of the impact member from the ground surface, thereby simulating an act of sweeping or batting out an opponent's hockey stick during a hockey face-off.

* * * * *